United States Patent
Pierson et al.

(10) Patent No.: US 8,788,759 B2
(45) Date of Patent: Jul. 22, 2014

(54) DOUBLE-BUFFERED DATA STORAGE TO REDUCE PREFETCH GENERATION STALLS

(75) Inventors: Matthew D Pierson, Murphy, TX (US); Joseph R M Zbiciak, Arlington, TX (US)

(73) Assignee: Texas Instruments Incorporated, Dallas, TX (US)

( * ) Notice: Subject to any disclaimer, the term of this patent is extended or adjusted under 35 U.S.C. 154(b) by 131 days.

(21) Appl. No.: 13/223,237

(22) Filed: Aug. 31, 2011

(65) Prior Publication Data

US 2012/0072674 A1 Mar. 22, 2012

Related U.S. Application Data

(60) Provisional application No. 61/387,367, filed on Sep. 28, 2010, provisional application No. 61/384,932, filed on Sep. 21, 2010.

(51) Int. Cl.
*G06F 9/38* (2006.01)
*G06F 12/08* (2006.01)

(52) U.S. Cl.
CPC ........ *G06F 12/0897* (2013.01); *G06F 12/0862* (2013.01); *G06F 12/0886* (2013.01); *G06F 2212/6022* (2013.01); *G06F 9/3844* (2013.01); *G06F 9/3802* (2013.01); *G06F 9/3806* (2013.01)
USPC ............................ 711/137; 711/113; 712/207

(58) Field of Classification Search
CPC ............ G06F 12/0862; G06F 12/0897; G06F 12/0886; G06F 2212/6022; G06F 9/3844; G06F 9/3802; G06F 9/3806
USPC ................................... 711/137, 113; 712/207
See application file for complete search history.

(56) References Cited

U.S. PATENT DOCUMENTS

| | | | | |
|---|---|---|---|---|
| 6,317,811 B1 * | 11/2001 | Deshpande et al. | ........... | 711/137 |
| 6,490,647 B1 * | 12/2002 | Batchelor et al. | ............. | 710/310 |
| 2005/0253858 A1 * | 11/2005 | Ohkami et al. | ............... | 345/531 |
| 2008/0183903 A1 * | 7/2008 | VanStee et al. | .................... | 710/5 |
| 2009/0240887 A1 * | 9/2009 | Okawara et al. | ............. | 711/118 |

* cited by examiner

*Primary Examiner* — Hashem Farrokh
(74) *Attorney, Agent, or Firm* — Robert D. Marshall, Jr.; Frederick J. Telecky, Jr.

(57) ABSTRACT

A prefetch unit includes a program prefetch address generator that receives memory read requests and in response to addresses associated with the memory read request generates prefetch addresses and stores the prefetch addresses in slots of the prefetch unit buffer. Each slot includes a buffer for storing a prefetch address, two data buffers for storing data that is prefetched using the prefetch address of the slot, and a data buffer selector for alternating the functionality of the two data buffers. A first buffer is used to hold data that is returned in response to a received memory request, and a second buffer is used to hold data from a subsequent prefetch operation having a subsequent prefetch address, such that the data in the first buffer is not overwritten even when the data in the first buffer is still in the process of being read out.

15 Claims, 4 Drawing Sheets

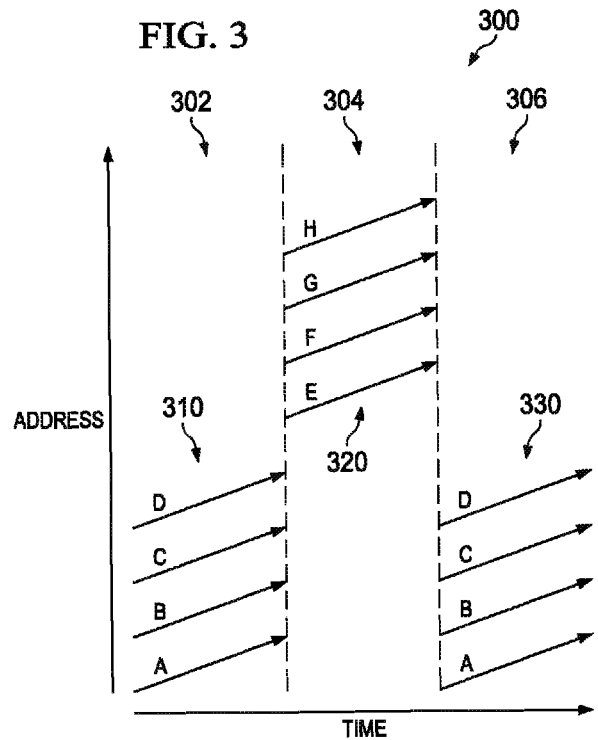
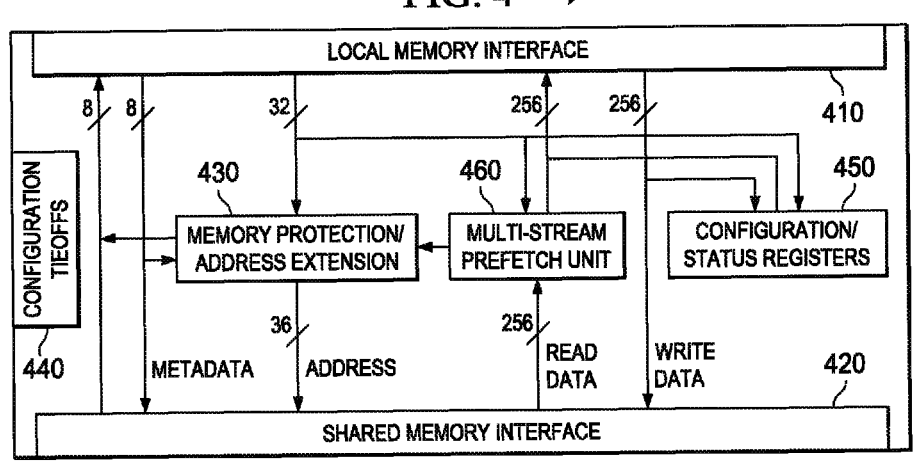

DOUBLE-BUFFERED DATA STORAGE TO REDUCE PREFETCH GENERATION STALLS

CLAIM OF PRIORITY

This application for Patent claims priority to U.S. Provisional Application No. 61/387,367 entitled "Combined integer to floating point conversions with varied precision formats" filed Sep. 28, 2010, and claims priority to U.S. Provisional Application No. 61/384,932 entitled "Prefetch Stream Filter with FIFO Allocation and Stream Direction Prediction" filed Sep. 21, 2010, wherein the applications listed above are incorporated by reference herein.

BACKGROUND

In computer architecture applications, processors often use caches and other memory local to the processor to access data during execution. The processors more efficiently execute instructions when, for example, data accessed by a processor is stored locally in a cache. Prefetchers are used to predictively access and store data in view of potential requests for data and/or program data stored in the memory. A prefetcher stores blocks of memory locally in a smaller, lower latency memory buffer using a replacement policy that governs which data are to be discarded when new data arrives. If the discarded data have been requested by the cache system but have not yet been sent to processor requesting the data, then new prefetches that are allocated to those locations are forced to stall (e.g., wait) until the data is returned to the cache to maintain cache coherency. Thus, an improvement in techniques for reducing stalls associated with generation of prefetch requests for a cache is desirable.

The problems noted above are solved in large part by a prefetch unit that decouples data return from prefetch generation to eliminate a race condition that occurs between old data waiting to be sent to the cache and data from the new prefetches returning (from main memory, for example). If the data being returned from a new prefetch for the slot that contains the waiting-to-be-sent data could potentially overwrite the waiting-to-be-sent data and thus compromise the cache's coherency.

As disclosed herein, a prefetch unit includes a program prefetch address generator that receives memory read requests and in response to addresses associated with the memory read request generates prefetch addresses and stores the prefetch addresses in slots of the prefetch unit buffer. Each slot includes a buffer for storing a prefetch address, two data buffers (in a parallel double-buffered configuration) for storing data that is prefetched using the prefetch address of the slot, and a data buffer selector for alternating the functionality of the two data buffers. A first buffer is used to hold data that is returned in response to a received memory request, and a second buffer is used to hold data from a subsequent prefetch operation having a subsequent prefetch address, such that the data in the first buffer is not overwritten even when the data in the first buffer is still in the process of being read out.

Accordingly, the prefetch unit uses a double data buffer to decouple the storage of data-to-be-sent (from the prefetch unit to the processor or higher-level cache, for example) from the storage of data (that is received as a result of prefetch generation). Thus, two locations exist for each slot in the prefetch unit and a status indicator is used to indicate in which location particular data resides. A first-selected buffer is used to store prefetches are being generated for a slot. The prefetched data is subsequently sent (to the processor or higher-level cache). To minimize processor stalls (for example), a prefetch is newly generated that also allocates data for the slot. A second-selected buffer is used to store the new data retrieved as a result of the newly generated prefetch. A metadata indicator bit is toggled (set and reset) to designate which buffer of the double buffer is the first-selected buffer and which buffer of the double buffer is the second-selected buffer. A read status register stores an additional address bit to ensure the correct buffer is read-out in response to a memory request for data stored by the prefetch unit.

BRIEF DESCRIPTION OF THE DRAWINGS

FIG. 3 is a timing diagram illustrating multi-stream memory accesses over time.

FIG. 4 is a block diagram illustrating a memory controller that includes a multi-stream prefetch unit in accordance with embodiments of the present disclosure.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used (throughout the following description and claims) to refer to particular system components. As one skilled in the art will appreciate, various names can be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical connection. Thus, if a first device couples to a second device, that connection can be through a direct electrical connection, or through an indirect electrical connection via other devices and connections. As used herein, a single device that is coupled to a bus (which includes one or more signals) can represent all instances of the devices that are coupled to each signal of the bus.

Figure 1:
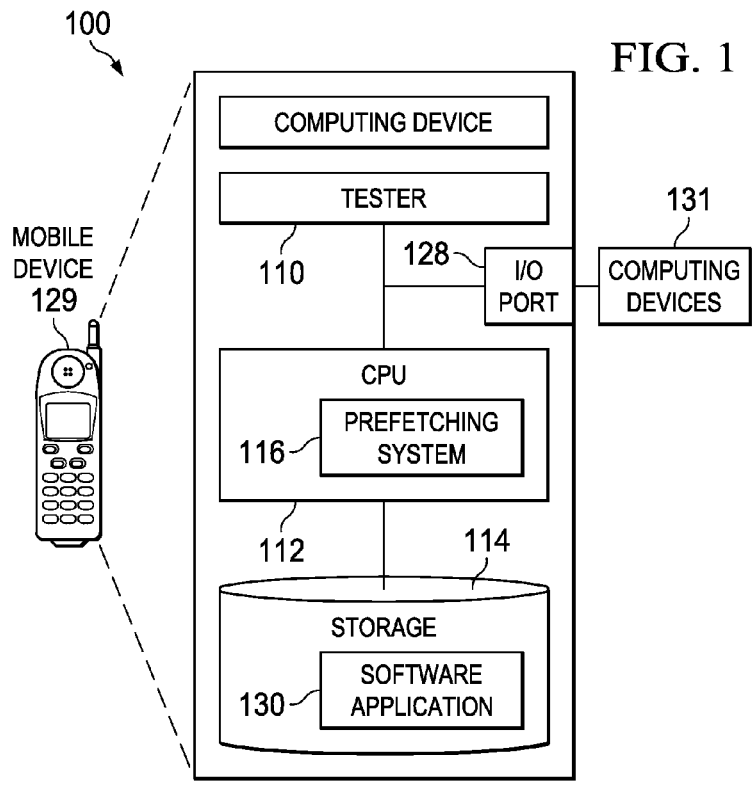
FIG. 1 depicts an illustrative computing device 100 in accordance with embodiments of the disclosure.

FIG. 1 depicts an illustrative computing device 100 in accordance with embodiments of the disclosure. The computing device 100 is, or is incorporated into, a mobile communication device 129 (such as a mobile phone or a personal digital assistant such as a BLACKBERRY® device), a personal computer, automotive electronics, or any other type of electronic system.

In some embodiments, the computing device 100 comprises a megacell or a system-on-chip (SoC) which includes control logic such as a CPU 112 (Central Processing Unit), a storage 114 (e.g., random access memory (RAM)) and tester 110. The CPU 112 can be, for example, a CISC-type (Complex Instruction Set Computer) CPU, RISC-type CPU (Reduced Instruction Set Computer), or a digital signal processor (DSP). The storage 114 (which can be memory such as SRAM (static RAM), flash memory, or disk storage) stores one or more software applications 130 (e.g., embedded applications) that, when executed by the CPU 112, perform any suitable function associated with the computing device 100. The tester 110 comprises logic that supports testing and debugging of the computing device 100 executing the software application 130. For example, the tester 110 can be used to emulate a defective or unavailable component(s) of the computing device 100 to allow verification of how the component(s), were it actually present on the computing device 100, would perform in various situations (e.g., how the component(s) would interact with the software application 130). I/O port 128 enables data from tester 110 to be transferred to computing devices 130. In this way, the software application 130 can be debugged in an environment which resembles post-production operation.

The CPU 112 typically comprises memory and logic which store information frequently accessed from the storage 114. Various subsystems (such as the CPU 112 and/or the storage 114) of the computing device 100 include one or prefetching systems 116, which are used to perform memory prefetch operations during the execution of the software application 130.

Prefetching systems 116 track memory requests from one or more streams using "slots" to maintain pointers to memory addresses used to prefetch data for each stream. Conventional prefetching systems stall prefetch generation for a slot until all the data stored in the slot is sent to the cache. However, delaying prefetches reduces the amount of latency a prefetch unit is able to hide, which adversely affects hurts performance. Increasing the number of slots and associated hardware of the prefetch unit helps to reduce the number of times prefetch generation is stalled. However, this approach involves larger area and power costs due to extra the hardware and added address comparators for hit checks for all of the slots.

Disclosed herein are techniques for reducing hardware latency associated with prefetch buffer memory accesses. The disclosed techniques reduce hardware latency by decoupling prefetch generation from prefetch hit data returns (e.g., returning data to a CPU or higher level cache in response to a memory request). Decoupling the start of prefetch generation from the end of returning requested hit prefetch data allows new prefetches to be generated and issued without having to wait for a successful conclusion of sending the hit prefetch data to the CPU or higher-level cache. Not having to wait for a successful conclusion of sending the hit prefetch data to the CPU or higher-level cache before generating the prefetch request thus minimizes the time required to service memory requests (which helps to achieve a design goal of the prefetch unit of reducing the maximum amount of latency of the memory requests). The disclosed technique can be implemented using an additional bit of metadata, the addition of the second buffer of the double buffer, and the use of a relatively small amount of control logic (in comparison to the added hardware of a conventional approach). Thus, storage for most of the metadata used is not replicated and the number of address comparators is not increased.

Figure 2:
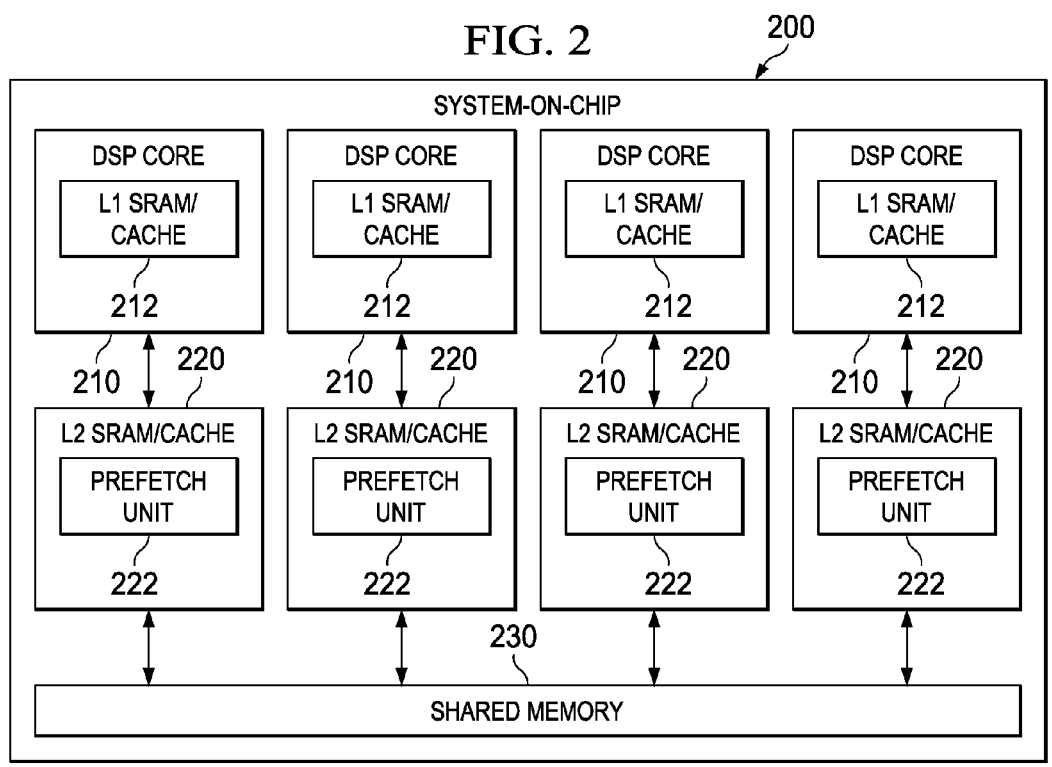
FIG. 2 is a block diagram illustrating a computing system including a prefetch unit in accordance with embodiments of the disclosure.

FIG. 2 is a block diagram illustrating a computing system including a prefetch unit in accordance with embodiments of the disclosure. Computing device 100 is illustrated as an SoC 200 that includes one or more DSP cores 210, SRAM/Caches 220, and shared memory 230. Although the illustrated elements of the computing system 200 are formed using a common substrate, the elements can also be implemented in separate substrates, circuit boards, and packages (including the shared memory 230).

Each DSP core 210 optionally includes a level-one data cache such as SRAM/Cache 212. Each DSP core 210 optionally is connected to a level-two cache such as SRAM/Cache 220. Each SRAM/Cache 220 optionally includes a prefetch unit 222 for prefetching data to provide relatively quick access to read and write memory. Additionally, each DSP core 210 is coupled to a shared memory 230, which usually provides slower (and typically less expensive) memory accesses than SRAM/Cache 212 or SRAM/Cache 220. The shared memory 230 stores program and data information that can be shared between each DSP core 210.

In various embodiments, the prefetch unit 222 is a program prefetcher that allocates an available slot to a program accesses and provides a double buffer that uses a first buffer to hold hit data that being read from the prefetcher and a second buffer that allows replacement data to be prefetched before the completion. In contrast, conventional solutions use additional, multiple slots (or potentially allow prefetch unit stalls during prefetch generation) to prevent data from being overwritten.

FIG. 3 is a timing diagram illustrating multi-stream memory accesses over time. Plot 300 vertically represents increasing memory addresses and horizontally represents memory accesses of data over time. The time continuum illustrated horizontally is divided into three periods (302, 304, and 306) that represent periods in time in which an execution of a program is, for example, evaluating different equations. In period 302, a program executing a programming loop statement [1] such as (in "c" language):

$$\text{for}(i=0; i<n; i++)\{d[i]=a[i]+b[i]+c[i]\} \qquad [1]$$

performs memory accesses that, when plotted, produces traces (designated generally) 310. Each reference to an element of arrays "a," "b," "c," and "d" respectively produces a trace that, over time, progresses higher in address space. Thus, each trace of traces 310 is an illustration of a stream.

When variable "i" reaches terminal count "n," the program execution proceeds to period 304, where (for example) traces 320 are formed when another loop statement is executed. Likewise, traces 330 are formed when program execution proceeds into period 306 and re-executes programming loop statement [1]. Thus, each trace of the traces 320 and 330 is an illustration of a stream, and the plot 300 generally illustrates multi-stream memory accesses.

FIG. 4 is a block diagram illustrating a memory controller that includes a multi-stream prefetch unit in accordance with embodiments of the present disclosure. Memory controller 400 includes a local memory interface 410. The local memory interface 410 provides an interface and protocol system to handle memory requests for a local memory such as SRAM/Cache 220. In addition to providing address, read data, and write data signals, the local memory interface 410 provides information concerning prefetchability, cacheability, and an indication of half-line L2 (e.g., cache "level two") line allocation in metadata signals. The local memory interface 410 signals include information concerning command signals detailing a request, elevating the priority of a request, indicating a data versus instruction fetch, indicating whether a request is "cacheable in L2" cache, indicating a cache line size of request, and indicating a privilege/secure level of the request.

Memory controller 400 includes a shared memory interface 420. The shared memory interface 420 provides an interface and protocol system to handle memory requests for a shared memory such as shared memory 230. The shared memory interface 420 also provides additional metadata to shared memory and/or external slaves. The metadata provides information such as memory segmentation endpoints, physical addresses within sections of segmented memory, cacheability of requests, deferred privilege checking, access type (data, instruction or prefetch), and request priority and elevated priority.

Memory controller 400 includes unit for memory protection/address extension 430. The unit for memory protection/address extension 430 performs address range lookups, memory protection checks, and address extensions by combining memory protection and address extension into a single, unified process. The memory protection checks determine what types of accesses are permitted on various address ranges within the memory controller 400's 32-bit logical address map. The address extension step projects those accesses onto a larger 36-bit physical address space.

Memory controller 400 can be controlled and configured using configuration tieoffs 440 and configuration/status registers 450. Configuration tieoffs 440, for example, can be set during the manufacturing process to configure operation of the memory controller 400 for a specific system. Configuration/status registers 450, for example, can be set during operation to configure and control operation of the memory controller 400 by reading status indications and providing commands.

Memory controller 400 includes a double-buffered prefetch unit 460. The double-buffered prefetch unit 460 is discussed below with respect to FIG. 5.

Figure 5:
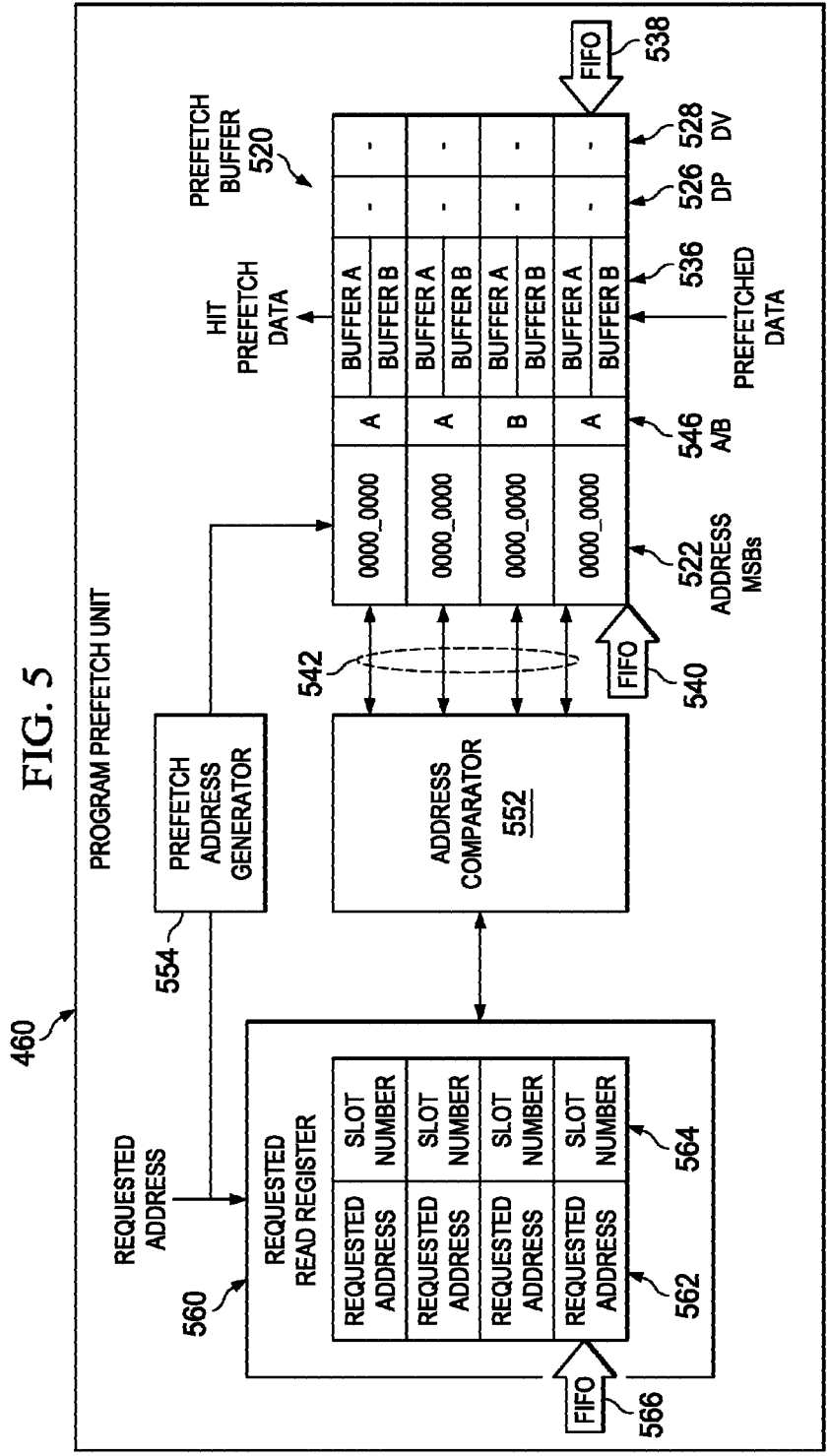
FIG. 5 is a block diagram illustrating a multi-stream prefetch unit in accordance with embodiments of the present disclosure.

FIG. 5 is a block diagram illustrating a double-buffered prefetch unit 460 in accordance with embodiments of the present disclosure. Double-buffered prefetch unit 460 typically includes a program prefetch buffer 520 (for prefetching program data for a program stream) and a requested read register predictor 560 (for maintaining read requests and controlling reads of the double buffers of the program prefetch buffer). Although a program prefetch buffer 520 is described in an embodiment as being a prefetch buffer for program accesses, the double-buffered prefetch unit 460 can also be used in the context of fetching data for multiple streams.

Double-buffered prefetch unit 460 includes the program prefetch buffer 520, which is used to prefetch program data for a program stream. In an embodiment, the double-buffered prefetch unit 460 is a relatively simple prefetch engine for servicing direct UP (level-one program) cache requests and L2 program fetches. The double-buffered prefetch unit 460 uses an extended memory prefetch scheme, extended to the full address space in shared memory. The double-buffered prefetch unit 460 handles cacheable, prefetchable program fetches as candidates for prefetching.

The double-buffered prefetch unit 460 as illustrated holds four logical slots, each of which is associated with storage for two 32-byte program fetches such as buffer A and B of PF (prefetch) data 536. Double buffering the data for each slot in PF data 536 allows for a prefetch to be started on a subsequent prefetch using buffer B (for example) before a memory request is made (or completed) for the data in buffer A of the slot (e.g., a return-wait state). The double-buffered prefetch unit 460 can reallocate a slot immediately if at least one of its two halves (e.g., buffer A or buffer B of PF data 536) is not busy and the slot is not in a hit-wait state (e.g., waiting for data to be returned from system memory for which a memory request has been made).

Field A/B 546 is a data buffer selector used to determine which buffer (Buffer A or Buffer B) is used to hold data that is in a return-wait state (and conversely, which buffer is used to hold data returned from a new prefetch generation). Field A/B 546 is toggled to avoid overwriting stored data when a return-wait state is encountered. Toggling field A/B 546 allows, for example, the data stored as a result of the new prefetch generation to be returned (e.g., read-out) to the requesting processor or cache without having to transfer the data to the "other" buffer, which minimizes latency.

The double-buffer approach allows new prefetch generation to proceed immediately when a prefetch hit results in a return-wait situation. Double buffering each slot of the double-buffered prefetch unit 460 speeds prefetching because the double-buffered prefetch unit 460 normally reallocates the slot associated with the demand fetch that most recently hits. Double buffering each slot of the double-buffered prefetch unit 460 also speeds prefetching when the time of allocation (when the local memory will read the data for the hit) is not ascertainable beforehand. Thus, the double-buffer approach allows the prefetch generation to proceed even before double-buffered prefetch unit 460 sends the hit data to the upstream local memory (e.g., SRAM/Cache 220).

Also, the program prefetch buffer 520 avoids reallocating a slot in the hit-wait state in case the prefetch associated with the slot is canceled. When the prefetch is canceled, the double-buffered prefetch unit 460 uses the address stored in the slot to regenerate the demand fetch. For example, a new prefetch generated too early by the double-buffered prefetch unit 460 may force another double-buffered prefetch unit 460 (belonging to a neighboring slave, for example) to cancel the earlier prefetch.

Each of the slots of the program prefetch buffer 520 has at least one address field 522, a data pending (DP) field 526, a data valid (DV) field 528, a double buffer 536 that contains a Buffer A and a Buffer B, and the A/B field as described above. Address field 522 typically stores (at least) the upper bits of a logical address associated with the associated slot. Data pending (DP) field 526 is used to indicate whether a prefetch is outstanding the associated slot. Data valid (DV) field 528 is used to indicate whether the program data in the associated slot is valid. The double-buffered prefetch unit 460 does not necessarily keep a separate "address valid" bit for each slot. Instead, the double-buffered prefetch unit 460 launches prefetch requests for any slot that has data pending or data valid bit that is set to be valid. Thus, a demand fetch would normally only "hit" slots for which DP is pending or DV is valid.

The double-buffered prefetch unit 460 allocates slots using a FIFO allocation ordering system. For example, a first slot is allocated first (by using FIFO counter 540 to point the first slot), followed by the second slot, the third slot, and so on until the last slot (such as the fourth slot) before wrapping back to the first slot. Each slot is associated with two 32-byte data buffers that are structured respectively as a first and second portion of a double-buffer. Metadata returned with a fetch (such as returned memory access permissions) can be stored in additional or otherwise unused bits of the first and/or second portions of the double buffer.

In the case of a typical prefetch hit (determined by prefetch address comparators 552, for example) that occurs in response to a memory request, the double-buffered prefetch unit 460 queues the prefetch program data for return to the requesting processor or cache. If the double-buffered prefetch unit 460 queues has no other return data queued, the double-buffered prefetch unit 460 can begin returning data in response to the memory request.

Program prefetch address generator 554 generates program prefetch addresses in response to received addresses that are associated with memory requests. When a candidate program fetch misses the program prefetch buffer, addresses are generated for fetching the next 128 bytes following the last demand fetch address that missed the buffer. When a program fetch hits the program prefetch buffer, addresses are generated for the next 32, 64, 96, or 128 bytes, depending on whether the fetch hit the oldest, second oldest, second youngest or youngest slot (respectively) in the buffer. Thus, the program prefetch generator 554 keeps the prefetch buffer 128 bytes ahead of the current program stream, and provides the addresses to quickly switch streams when the program branches to a new location.

Because of bus width limitations, the length of the memory lines associated with slots are often wider than the bus width used to retrieve data for filling the lines. Thus memory lines are typically requested (for example) on a half-line or sub-line basis where the data to be cached is sent from a lower-level memory to the higher-level cache as a series of data bursts to retrieve the entire line. The data for storing in the allocated cache line are sent such that the requested portion (e.g., the data that is addressed by the demand memory request) of the line returns first (the "critical" sub-line), which is then followed by the subsequent ("non-critical") sub-lines. A CPU (for example) that generated the demand request then "unstalls" and resumes execution when the critical sub-line is fetched from the cache.

When a memory request for program instructions misses the prefetch buffer, the prefetch unit 460 sets the predicted next prefetch slot to the first allocated slot. When a prefetch hit of a critical sub-line occurs due to an L2 request for program prefetching, no action is taken because no new prefetches typically result. When a prefetch hit of a non-critical sub-line occurs due to an L2 request (which typically triggers new prefetches), the predicted next prefetch slot is set to the first allocated slot. When a prefetch hit occurs due to an L1P (level-one program) request, the predicted next prefetch slot is set to one slot after the slot just hit in accordance with the FIFO slot allocation order. The prefetch unit 460 determines the criticality of the sub-line being fetched and the origin of the memory request by evaluating the metadata signals discussed above with respect to FIG. 4.

Requested read register 560 receives a memory request having an address for reading data (including program instruction data) stored in memory. Requested read register 560 stores the requested address in the requested address (Req. Addr.) field 562. The requested address is evaluated (using bus 542, for example) by address comparator 552 to determine whether the requested address "hits" the program prefetch buffer 520. If a hit occurs, the address comparator 552 passes to the requested read register 560 the slot number of the slot "hit" by the requested address. The hit slot number for the received memory request is stored in the Slot # field 564.

Requested read register 560 is organized as a FIFO such that received memory requests are handled using a First In, First Out policy. FIFO counter 566 is cycled such that each request (e.g., row) is handled in the order received, and that the each of the four slots is handled (e.g., the data associated with a slot is returned) before the FIFO counter 566 is recycled back to the first slot.

The program prefetch unit 460 heuristically determines the predicted next prefetch (PNP) by anticipating that the next prefetch hit will be for the slot "after" the slot for the current hit in the prefetch buffer. The slot "after" the currently hit slot is the next slot that follows the currently hit slot in accordance with the direction of the stream that is associated with the currently hit slot. The probabilities for correctly predicting the next prefetch are increased (over random estimates, for example) because (as disclosed herein) prefetch slots are allocated in a FIFO allocation order, and thus prefetch hits are more likely to occur in the order used for FIFO allocation (e.g., the FIFO allocation order). The program prefetch unit 460 uses FIFO counter 538 to point to the predicted next prefetch.

In the case of a typical prefetch hit (determined by prefetch address comparators 552, for example) that occurs in response to a memory request, the multi-stream prefetch unit 460 queues the prefetch data for return. If the multi-stream prefetch unit 460 queues has no other return data queued, the multi-stream prefetch unit 460 can begin returning data in response to the memory request.

In the event where the prefetch unit 460 has not successfully predicted the memory request in the event of a hit in the data prefetch buffer 520, the data can be retrieved from data prefetch buffer in two clock cycles. During the first clock cycle prefetch address comparators 552 drives an enable line (e.g., in bus 542) to select a slot that is associated with the address of the memory request and to set-up a selected portion (e.g., upper-half and/or lower-half) of the slot for a memory read. During the second clock cycle, data is read from buffer A and/or B of prefetch (PF) data 536 for the selected slot. A data prefetch buffer driver (not shown) is enabled to drive a data portion of a bus so that the requested data can be retrieved in response to the memory request.

Thus, the prefetch buffer would ordinarily take two full clock cycles to reply to a prefetch hit: to potentially reduce the latency of two clock cycles, anticipating which slot (and which "side" of the double buffer of the slot) would likely be hit next and provisions the data for readout in one clock cycle. In an embodiment, the anticipated slot number and the read out half of the double buffer are enabled ahead of time (e.g., before a next memory request is processed) to minimize (for example) the time required to retrieve the data from the associated half-slot. Thus, when a new memory request arrives that matches the previously asserted address, the prefetch buffer can respond with data in the following clock cycle, and thus respond within a zero wait-state response time.

Figure 6:
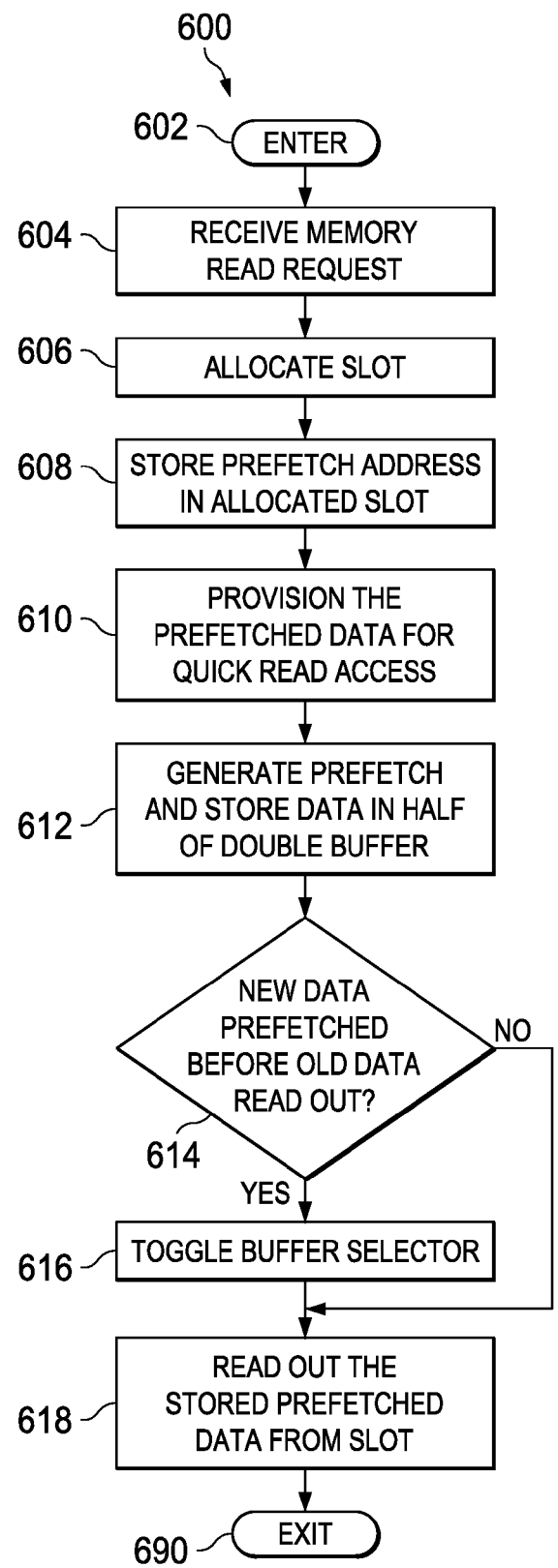
FIG. 6 is a process diagram illustrating a method of double buffering to reduce prefetch generation stalls in accordance with embodiments of the present disclosure.

FIG. 6 is a process diagram illustrating a method of double buffering to reduce prefetch generation stalls in accordance with embodiments of the present disclosure. Process 600 is entered at node 602 and proceeds to function 604. At function 604, a memory read request is received that contains an address for retrieving from memory.

At function 606, a slot is allocated in accordance with an order in which a prefetch FIFO counter is modified to cycle through the slots of the array before wrapping around to a first slot of the array for storing portions of predicted addresses.

In function 608, prefetch addresses are stored in an allocated slot. For example, program prefetch addresses are generated in response to received addresses that are associated with memory requests. When a candidate program fetch misses the program prefetch buffer, addresses are generated for fetching the next 128 bytes following the last demand fetch address that missed the buffer. When a program fetch hits the program prefetch buffer, addresses are generated for the next 32, 64, 96, or 128 bytes, depending on whether the fetch hit the oldest, second oldest, second youngest or youngest slot (respectively) in the buffer. The addresses are stored in slots as allocated by the FIFO prefetch counter.

In function 610, the prefetched data from the allocated slot is provisioned to minimize a read time for reading the stored prefetched data. In an embodiment, the prefetched data prefetched from the next predicted address is provisioned by asserting read set-up control signals coupled to the allocated slot of the array in which the prefetched data prefetched from the next predicted address is stored.

In function 612, a prefetch operation is generated and the prefetched data is stored (as described in functions 614 and 616 below) in a half of a double buffer for data (including program instruction data). Which half of the double buffer is used to store the prefetched data is determined by the status of a buffer selector that is toggled in certain situations where overwriting data in the double buffer might occur. For example, prefetch generation is allowed to proceed immediately when a prefetch hit results in a return-wait situation (where, for example, a prefetch is started on a subsequent prefetch that uses a first half of the double buffer for storage before a memory request is made for the data in the second half of the double buffer of the slot).

In function 614, if new prefetch data from a generated prefetch operation is returned before the stored data in a selected half of the buffer has been read out, the process flow continues to function 616, or if not, the process flow continues to function 618.

In function 616, the buffer selector is toggled to avoid writing the prefetched data over the stored data and to select the other half of the double buffer for storing the prefetch data. Thus the subsequently stored data from the subsequent prefetch is stored in the "other" half of double buffer for returning to a higher-level memory system or processor in the event that a memory request "hits" the stored subsequent prefetch data. After the provisioned prefetched data is read-out, the process flow continues to function 618.

In function 618, the stored prefetched data is stored in a slot in response to a currently processed memory request. A slot number associated with the processed memory request can be used to select the stored prefetch data without using an address stored in the prefetch buffer. After the provisioned prefetched data is read-out from its slot, the process flow continues to node 690, where the process flow exits.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for generating memory prefetches in caching systems, comprising:
generating prefetch addresses in response to addresses associated with memory read requests;
storing the prefetch addresses in slots of a prefetch buffer, wherein each slot includes a buffer for storing a prefetch address, a first data buffer and second data buffer for storing data that is prefetched using the prefetch address stored in the slot, and a data buffer selector for alternating a designation of the first and second buffers;
allocating a slot associated with a next predicted address in accordance with an order in which a prefetch FIFO counter is modified to cycle through the slots of an array of slots before wrapping around to a first slot of the array for storing portions of predicted addresses;
in the allocated slot, reading data from the first data buffer, and storing subsequent data from a subsequent prefetch operation having a subsequent prefetch address in the second data buffer before completing the operation of reading the data in the first buffer; and
alternating the designation of the first and second buffers by modifying the state of the data buffer selector after the subsequent data has been stored in the second data buffer.

2. The method of claim 1, comprising storing metadata associated with a status of each slot within each slot.

3. The method of claim 2, wherein the stored metadata associated with the status of each slot includes a data pending indicator and a data valid indicator.

4. The method of claim 1, comprising maintaining an array of request slots for received memory requests and processing the requests according to a First In, First Out (FIFO) policy.

5. The method of claim 4, wherein each request slot of the array of request slots for the received memory requests includes a buffer for the address and a prefetch buffer slot number allocated for the address.

6. The method of claim 4, wherein the prefetch buffer slot number associated with a request slot that is currently being processed is used to enable the reading data from the first data buffer.

7. The method of claim 1, wherein a prefetch buffer slot number associated with the slot to be processed after a currently processed request slot is used to provision the reading data from the first data buffer of the slot pointed to by the prefetch buffer slot number associated with the slot to be processed after the currently processed request slot.

8. The method of claim 1, wherein the memory read request associated with the allocated slot is associated with a program stream issued by a processor.

9. The method of claim 1, wherein the prefetched data is retrieved from a main memory.

10. The method of claim 1, wherein the storing subsequent data from a subsequent prefetch operation having a subsequent prefetch address in the second data buffer is performed while the data in the first buffer is in a return-wait situation.

11. The method of claim 1, comprising storing metadata associated with the subsequent prefetch operation in a buffer associated with the allocated slot.

12. A digital system, comprising:
a memory including local memory and a lower-level hierarchical memory for storing and retrieving data;
a prefetch unit that includes a prefetch address generator that is arranged to generate prefetch addresses in response to addresses associated with memory read requests, a prefetch buffer that is arranged to store the prefetch addresses in slots of the prefetch buffer, wherein each slot includes a buffer for storing a prefetch address, a first data buffer and second data buffer for storing data that is prefetched using the prefetch address stored in the same slot, and a data buffer selector for alternating designation of the first and second data buffers, a data buffer selector that is arranged to alternate the designation of the first and second data buffers in a selected slot in response to a return-wait situation wherein subsequent data from a subsequent prefetch operation having a subsequent prefetch address in the second data buffer is to be stored in a second data buffer before completing the operation of reading the data in the first data buffer and a prefetch FIFO counter that is modified to cycle through the slots of an array of slots to select the selected slot before wrapping around to a first slot of the array for storing portions of predicted addresses.

13. The system of claim 12, wherein the prefetch unit includes an array of request slots that is arranged to maintain received memory requests and process the received memory requests according to a First In, First Out (FIFO) policy, wherein each request slot of the array of request slots for the received memory requests includes a buffer for the address and a prefetch buffer slot number allocated for the address.

14. The system of claim 13, wherein the prefetch buffer slot number associated with a request slot that is currently being processed is used to enable the reading data from the first data buffer.

15. The system of claim 14, wherein the prefetch buffer slot number associated with the slot to be processed after the currently processed request slot is used to provision the reading data from the first data buffer of the slot pointed to by the prefetch buffer slot number associated with the slot to be processed after the currently processed request slot.

* * * * *